United States Patent
Chethik

(12) 
(10) Patent No.: US 6,195,195 B1
(45) Date of Patent: *Feb. 27, 2001

(54) OPTO-MECHANICAL CONTROLLED VARIABLE RF/MICROWAVE DELAY ELEMENT AND METHOD

(75) Inventor: Frank Chethik, Palo Alto, CA (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,618

(22) Filed: Mar. 11, 1999

(51) Int. Cl.[7] .................................................. G02B 26/00
(52) U.S. Cl. ......................... 359/290; 359/245; 359/259; 359/279
(58) Field of Search .................................. 359/290, 245, 359/256, 259, 263, 279, 305

(56) References Cited

U.S. PATENT DOCUMENTS 4,530,573 * 7/1985 Wolkstein ............................. 359/305
5,475,525 * 12/1995 Tournois et al. ..................... 359/245
5,526,170 * 6/1996 Eaman et al. ........................ 359/279
5,796,510 * 8/1998 Yao ...................................... 359/256
5,978,125 * 11/1999 Yao ...................................... 359/256

* cited by examiner

Primary Examiner—Loha Ben
(74) Attorney, Agent, or Firm—Kenneth W. Float

(57) ABSTRACT

A delay element and method for delaying an RF/microwave signal. The delay element uses a laser and an RF modulator to modulate a laser beam using an applied RF/microwave input signal. Collimating optics collimate the modulated laser beam and couple the beam to a delay element that controllably delays the modulated laser beam and hence the RF/microwave signal. The delay element has fixed retroreflectors, moveable retroreflectors disposed on a moveable armature or permanent magnet, and a coil disposed on a spring and coupled to the moveable armature. The beam is reflected multiple times between the fixed and multiple moveable retroreflectors. A dash pot may be used to suppress mechanical oscillation of the permanent magnet and moveable retroreflectors. A delay control current source supplies current to the coil to control movement of the moveable retroreflectors and thus the path length and delay experienced by the modulated laser beam. An RF detector detects and recovers the RF input signal to provide a delayed RF output signal from the delay element.

10 Claims, 2 Drawing Sheets

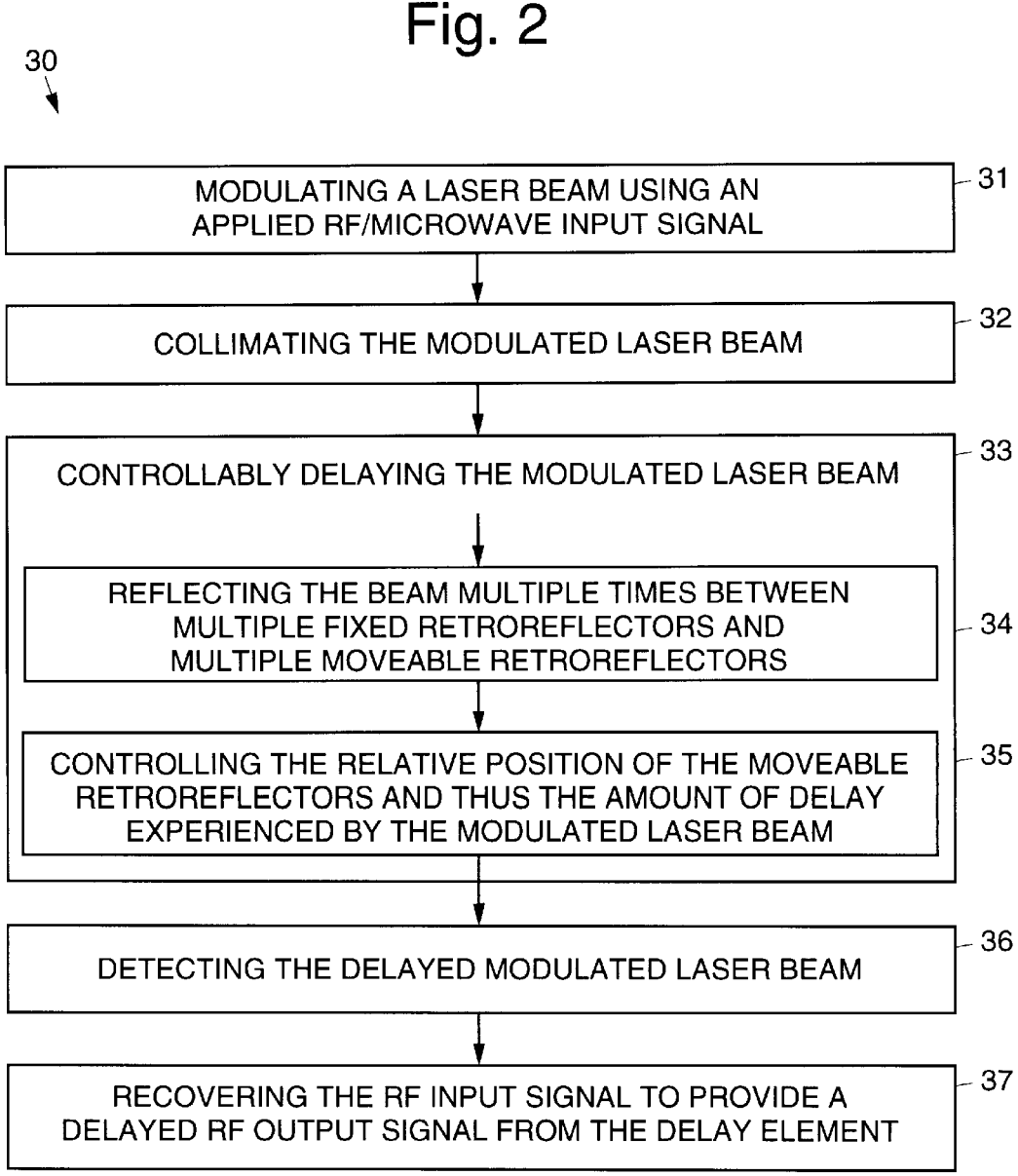

OPTO-MECHANICAL CONTROLLED VARIABLE RF/MICROWAVE DELAY ELEMENT AND METHOD

BACKGROUND

The present invention relates generally to delay elements and methods, and more particularly, to an opto-mechanical controlled variable RF/microwave delay element and method.

Conventional delay elements used to delay an RF or microwave signal have typically employed variable index optical fibers and a tunable laser, or variable drift velocity multi-gate field effect transistors, for example. Problems with such conventional delay elements used to delay an RF or microwave signals include very limited delay range and signal distortion, for example. It would be desirable to have a delay element and method that is capable of large delay variation and signal linearity.

Therefore, it would be an improvement to have a variable RF/microwave delay element and method that overcomes the limitations of conventional delay elements and methods.

SUMMARY OF THE INVENTION

The present invention provides for an improved opto-mechanical controlled variable RF/microwave delay element and method. The delay element comprises a laser and an RF modulator for modulating an output beam from the laser using an applied RF/microwave input signal. Injection optics are used to collimate the modulated laser beam and couple the beam to a delay element.

The delay element controllably delays the modulated laser beam and comprises a plurality of fixed retroreflectors, a plurality of moveable retroreflectors disposed on a moveable armature comprising a permanent magnet, and a coil that is coupled to the permanent magnet and disposed on a spring. A dash pot is used to suppress mechanical oscillation of the coil and moveable retroreflectors.

A delay control current source supplies current to the coil to control displacement of the moveable retroreflectors and thus the amount of delay experienced by the modulated laser beam and hence the RF/microwave signal. An RF detector is disposed to receive the delayed modulated laser beam and recover the RF input signal to provide a delayed RF output signal from the delay element.

The present invention thus integrates RF/microwave, optical and mechanical components to provide an improved opto-mechanical controlled variable RF/microwave delay element. The present opto-mechanical controlled variable RF/microwave delay element has a relatively simple architecture, has a relatively low cost and is relatively easy to manufactured.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 2 illustrates an exemplary signal delay method in accordance with the principles of the present invention.

DETAILED DESCRIPTION

Figure 1:
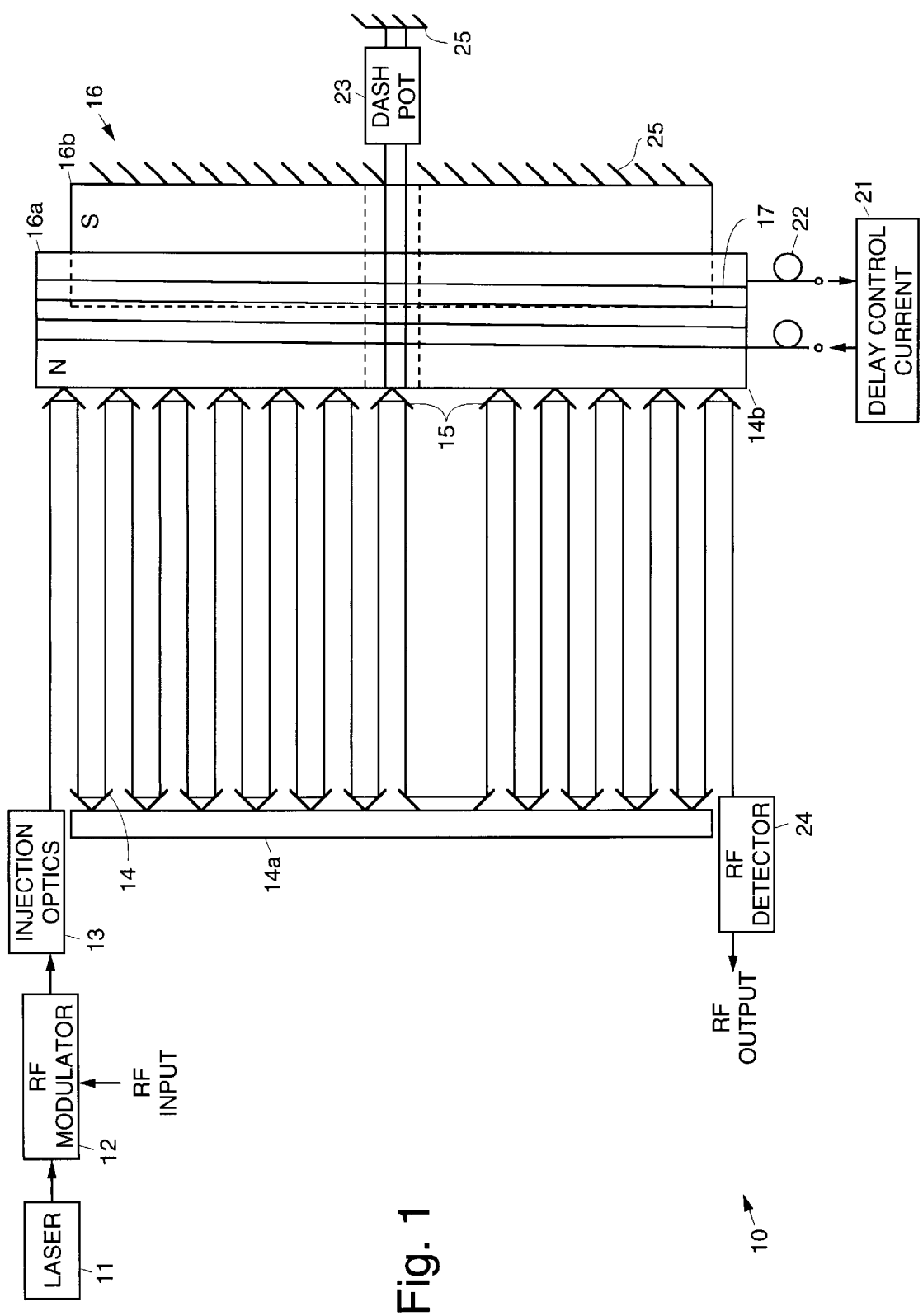
FIG. 1 illustrates an exemplary opto-mechanical controlled variable RF/microwave delay element in accordance with the principles of the present invention.

Referring to the drawing figure, it illustrates an exemplary opto-mechanical controlled variable RF/microwave delay element 10 in accordance with the principles of the present invention. The exemplary opto-mechanical controlled variable RF/microwave delay element 10 comprises a laser 11, such as may be provided by a diode laser 11 that provides a laser output beam at a wavelength of 0.6 $\mu$m for example. The output beam of the laser 11 is input to an RF modulator 12 and is modulated by an RF or microwave input signal applied to the RF modulator 12.

The modulated laser beam provided by the RF modulator 12 is coupled by way of injection or collimating optics 13 which collimates the modulated laser beam. The modulated laser beam is applied to a delay element 20 that controls the delay of the modulated laser beam. The delay element 20 comprises a plurality of fixed retroreflectors 14 disposed on a fixed armature 14a and a plurality of moveable retroreflectors 15 disposed on a moveable armature having a coil 17 surrounding a permanent magnet 16. The plurality of moveable retroreflectors 15 are disposed on a surface of the moveable armature facing the fixed retroreflectors 14. The permanent magnet 15 has north (N) and south (S) pole elements 15a, 15b.

The coil 17 is disposed around the permanent magnet 15. The coil 17 is coupled to a delay control current source 21. The coil 17 is mounted on a spring 22. The delay control current source 21 couples current to the coil 17 to control the amount of displacement of the moveable retroreflectors 15. A dash pot 23 or other damping device 23 is connected between the moveable armature and a housing 25 or frame 25 and is used to provide damping to suppress its mechanical oscillation in response to changes in control current. An RF detector 24 is disposed to receive the delayed modulated laser beam and recover the RF input signal to provide a delayed RF output signal that is output from the delay element 10. The RF detector 24 may comprise a photodiode or a photo transistor, for example.

In operation, the RF/microwave modulated laser beam generated by the laser 11 and RF modulator 12 is collimated by the injection optics 13. The collimated modulated laser beam is reflected multiple times between the fixed retroreflectors 14 on the fixed armature 14a and the moveable retroreflectors 15 on the moveable armature 14b.

The position of the moveable armature 14b and hence the position of the plurality of moveable retroreflectors 15 is controlled by varying an externally applied current to the coil 17 that is fixed to the moveable armature 14b. This controls the amount of delay experienced by the laser beam and hence the RF/microwave signal. The dash pot 23 provides damping to suppress mechanical oscillation of the moveable armature 14b to applied step changes in control current supplied to the coil 17 from the delay control current source 21.

The present invention may be used for RF/microwave signal processing systems, delay matching systems, phase array systems, correlation processors and interferometric systems, for example.

Referring now to FIG. 2, it illustrates an exemplary signal delay method 30 in accordance with the principles of the present invention. The exemplary signal delay method 30 comprises the following steps.

A laser beam is modulated 31 using an applied RF/microwave input signal. The modulated laser beam is collimated 32. The modulated laser beam is controllably delaying 33 by reflecting 34 the beam multiple times between multiple fixed retroreflectors and multiple moveable retroreflectors, and controlling 35 the relative position of the moveable retroreflectors and thus the amount of delay experienced by the modulated laser beam. The delayed modulated laser beam is detected 36 and recovered 37 to provide a delayed RF output signal.

Thus, an improved opto-mechanical controlled variable RF/microwave delay element has been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Delay apparatus comprising:
   a laser;
   a modulator for modulating an output beam from the laser using an applied input signal;
   injection optics for collimating the modulated laser beam;
   a delay element for controllably delaying the modulated laser beam that comprises a plurality of fixed retroreflectors, a plurality of moveable retroreflectors disposed on a moveable armature comprising a permanent magnet, a coil disposed on a spring and coupled to the permanent magnet, and a damping device for suppressing mechanical oscillation of the retroreflectors mounted to the moveable armature;
   a delay control current source coupled to the coil for supplying current to the coil to control movement of the plurality of moveable retroreflectors and thus the amount of delay experienced by the modulated laser beam; and
   a detector disposed to receive the delayed modulated laser beam and recover the input signal to provide a delayed output signal from the delay element.

2. The delay apparatus recited in claim 1 wherein the laser comprises a diode laser.

3. The delay apparatus recited in claim 1 wherein the detector comprises a photodiode.

4. A signal delay method comprising the steps of:
   modulating a laser beam using an applied input signal;
   collimating the modulated laser beam to produce a single collimated modulated laser beam;
   controllably delaying the single collimated modulated laser beam; and
   detecting the single delayed collimated modulated laser beam to recover the input signal and provide a delayed output signal.

5. The method recited in claim 4 wherein the step of controllably delaying the modulated laser beam comprises reflecting the beam multiple times between multiple fixed retroreflectors and multiple moveable retroreflectors, and controlling the relative position of the moveable retroreflectors and thus the amount of delay experienced by the modulated laser beam.

6. The method recited in claim 5 wherein the step of controlling the relative position of the moveable retroreflectors comprises the step of supplying current to a coil to control displacement of the moveable retroreflectors.

7. The method recited in claim 5 further comprising the step of suppressing mechanical oscillation of the moveable retroreflectors while delaying the modulated laser beam.

8. A signal delay method comprising the steps of:
   modulating a laser beam using an applied input signal;
   collimating the modulated laser beam;
   controllably delaying the modulated laser beam by reflecting the beam multiple times between multiple fixed retroreflectors and multiple moveable retroreflectors, and controlling the relative position of the moveable retroreflectors and thus the amount of delay experienced by the modulated laser beam; and
   detecting the delayed modulated laser beam to recover the input signal and provide a delayed output signal.

9. The method recited in claim 8 wherein the step of controlling the relative position of the moveable retroreflectors comprises the step of supplying current to a coil to control displacement of the moveable retroreflectors.

10. The method recited in claim 8 further comprising the step of suppressing mechanical oscillation of the moveable retroreflectors while delaying the modulated laser beam.

* * * * *